United States Patent [19]

Kurosawa et al.

[11] Patent Number: 4,673,105

[45] Date of Patent: Jun. 16, 1987

[54] DISPENSING MECHANISM FOR VENDING MACHINES

[75] Inventors: Akihito Kurosawa; Osamu Anazawa, both of Maebashi, Japan

[73] Assignee: Sanden Corporation, Gunma, Japan

[21] Appl. No.: 760,639

[22] Filed: Jul. 30, 1985

[30] Foreign Application Priority Data

Jul. 31, 1984 [JP] Japan .......................... 59-116323[U]

[51] Int. Cl.[4] .............................................. B65G 59/06

[52] U.S. Cl. .................................... 221/281; 221/298; 312/257 SM

[58] Field of Search .................... 221/64, 92, 281, 282, 221/251, 289, 294, 295, 298, 299, 301, 116, 117, 131; 312/257 SM, 257 A; 292/202

[56] References Cited

U.S. PATENT DOCUMENTS 2,221,016 11/1940 Wood .............................. 221/281 X 4,514,020 4/1984 Strasser ........................... 292/202 X

FOREIGN PATENT DOCUMENTS 3344304 6/1984 Fed. Rep. of Germany .

*Primary Examiner*—Joseph J. Rolla

*Assistant Examiner*—Kevin P. Shaver

*Attorney, Agent, or Firm*—Banner, Birch, McKie & Beckett

[57] ABSTRACT

An article dispenser for a vending machine includes an article storage area having a front opening and a bottom opening with a dispensing mechanism having an article holding device disposed in the lower portion of the storage area. The storage area is defined by two side plates, a back plate and an upper plate, and the front opening of the storage area formed for loading the articles is partly covered by a pivotably supported stopper plate. A U-cross section shaped element is fixed on each side plate at a position to oppose the holding device of the dispensing mechenism and a free end of the U-shaped element extends into a rectangular hole formed through the stopper plate to effect engagement therebetween whereby partial deformation of the side plates is prevented by engagement between the U-shaped element and the stopper plate.

2 Claims, 5 Drawing Figures

DISPENSING MECHANISM FOR VENDING MACHINES

BACKGROUND OF THE INVENTION

This invention relates to vending machines, and more particularly, to a dispensing mechanism adapted for dispensing rectangular, parallelepiped or cube shaped paper cartons containing a beverage or other liquid.

Various types of dispensing mechanisms have been used depending on the types of food products or goods being vended. One known type of dispensing mechanism which is suitable for vending rectangular, parallelepiped or cube shaped paper cartons is shown by the copending U.S. patent application of A. Kurosawa et al. Ser. No. 559,468 filed on Dec. 8, 1983, now U.S. Pat. No. 4,542,834. This type of dispensing is explained with reference to FIGS. 1–3 on the drawings.

A dispensing mechanism unit 1 includes an article storage area 2 and dispensing mechanism 3. The article storage area 2 comprises vertically disposed left and right side plates 2*a* and 2*b*, upper plate 2*c* and back plate 2*d*. A front support plate 2*e* extends across the front lower portion of said plates 2*a* and 2*b*, and is connected to both side plates. A front opening 4 is formed between side plates 2*a*, 2*b*, upper plate 2*c* and support plate 2*e* to provide access for loading the articles into storage area 2. Storage area 2 has a bottom discharge opening 5 through which the articles are dispensed.

Dispensing mechanism 3 is disposed within article storage area 2 and comprises a pair of flappers 3*a*, a rotatable shaft 3*b*, an article holding mechanism 3*c* and driving mechanism 9 for rotating rotatable shaft 3*b*. A support shaft 6*a* is removably attached to support plate 2*e* and another support shaft 6*b* is removably attached to back plate 2*d*. Support shafts 6*a* and 6*b* are axially spaced from one another and extend along a common axis. Each flapper 3*a* is pivotably supported by both supporting shafts 6*a* and 6*b*. The pair of flappers 3*a* are disposed in discharge opening 5 of storage area 2 to control the discharge of articles through opening 5. Rotatable shaft 3*b* extends vertically through the center portion of storage area 2 to divide storage area 2 into two columns for stacking the articles. Thus, one flapper 3*a* is disposed in storage area 2 below each column of articles. The lower end portion of rotatable shaft 3*b* is rotatably supported by a support bracket 8 fixed to back plate 2*d* and the upper portion of rotatable shaft 3*b* is connected to the driving mechanism 9 mounted on upper plate 2*c*.

Rotatable shaft 3*a* carries an arc shaped control plate 7 at its lower end. Control plate 7 contacts the lower or underside surface of flappers 3*a*. Therefore, when control plate 7 is in contact with both flappers 3*a*, both flappers 3*a* are aligned to lie in a horizontal position and discharge of articles through opening 5 is blocked.

Article holding mechanism 3*c* is disposed in storage area 2 at a position adjacent its lower end portion, i.e., holding mechanism 3*c* is at least aligned with the articles $S_1'$, $S_2'$ which are stacked above the lowermost articles $S_1$ and $S_2$ on the upper surface of flappers 3*a*. Holding mechanism 3*c* comprises a pair of flappers $3c_1$ which are rotatably supported on back plate 2*d* and support plate 2*e* similar to the manner of mounting flappers 3*a* of the dispensing mechanism 3. An arm $3c_2$ is fixed on rotatable shaft 3*b* to control movement of flappers $3c_1$. In accordance with the rotation of arm $3c_2$, one or the other of flappers $3c_1$ is pushed outwardly and upwardly. At that time, as shown in FIG. 3, the outer surface of this flapper $3c_1$ acts as a holding member to press an article S1, against the inner surface of side plate 2*a* or 2*b* and hold the article in position while an article below the held article is discharged through opening 5.

In this type construction of a dispensing mechanism, since avoiding premature discharge of articles is achieved by the clamping the articles between the side plate of the dispensing mechanism and a holding member, it is possible for the side plates of the dispensing mechanism to be deformed outwardly. This possibility is increased depending on increasing article size and/or increasing the holding force applied by the holding member. If deformation of the side plates does occur, smooth article discharging operations are interfered with.

One solution to the above problem would be to increase the strength of side plates. However, this would increase the cost of the apparatus and increase the weight of the dispensing mechanism.

SUMMARY OF THE INVENTION

It is a primary object of this invention to provide an improved dispensing mechanism for vending machines in which articles are smoothly dispensed without altering the holding conditions for the articles.

It is another object of this invention to provide a dispensing mechanism for vending machines capable of being utilized in prior dispensing mechanisms by undertaking only simple modifications.

It is still another object of this invention to realize the above objects with a simple construction and at a low cost.

An article dispenser for dispensing articles from a vending machine in accordance with this invention includes an article storage area defined by two side plates, a back plate and an upper plate to hold stacks of articles, and a dispensing mechanism. The storage area is provided with a front opening to accommodate loading the articles thereinto and bottom opening for dispensing the lowermost stacked articles. The dispensing mechanism includes a holding device disposed in the lower portion of the article storage area to control the dispensing of the articles. A means for preventing partial deformation of the side plates is fixed on each of the side plates, disposed to oppose the holding device of the dispensing mechanism.

One feature of this invention utilizes a U-cross sectional shaped element fixed on each side plate. A free end of the U-shaped element extends into a rectangular hole formed through the stopper plate which is disposed on the front opening, thereby covering the front opening to prevent the articles from dropping out of the article storage area. Therefore, outward deformation of each side plate is prevented by the engagement between the U-shaped element and the stopper plate.

Further objects, features, and other aspects of this invention will be understood from the following detailed description of a preferred embodiment of this invention, referring to the annexed drawings.

DETAILED DESCRIPTION OF THE PREFERRED EMBODIMENT

Figure 1:
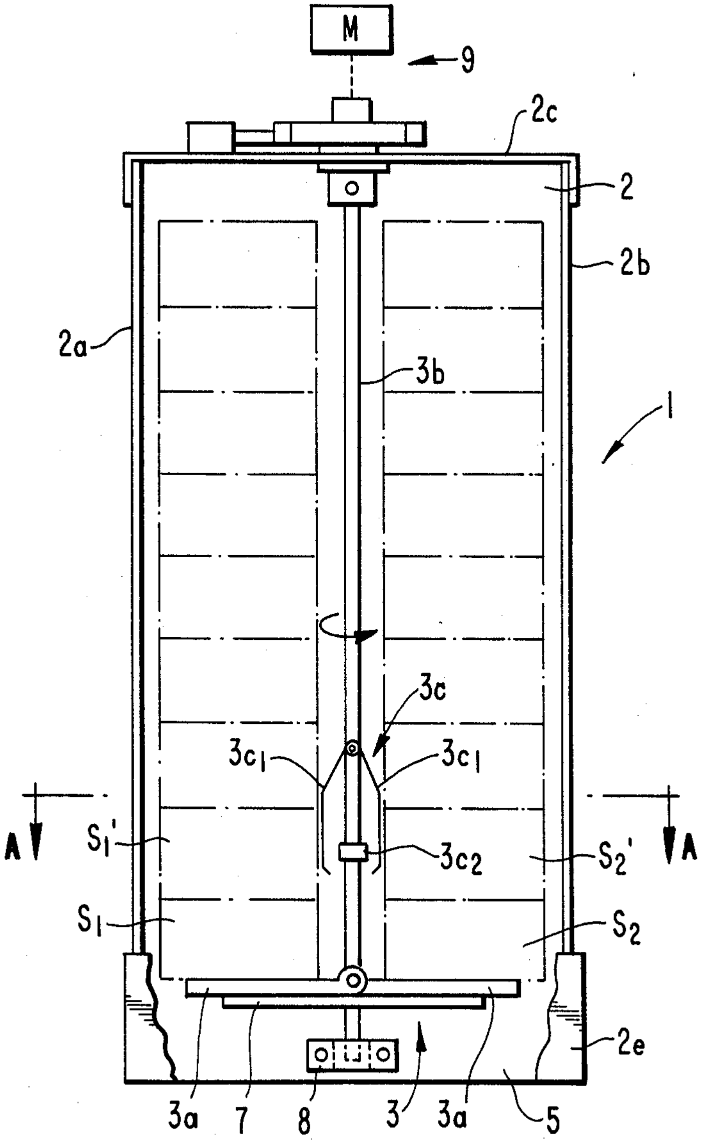
FIG. 1 PRIOR ART
FIG. 1 is a front end view of a prior art dispensing mechanism.
Figure 2:
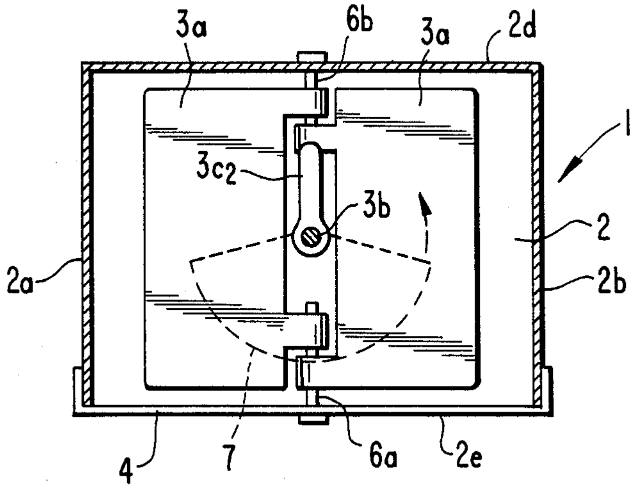
FIG. 2 PRIOR ART
FIG. 2 is a sectional view taken along line A—A on FIG. 1.
Figure 3:
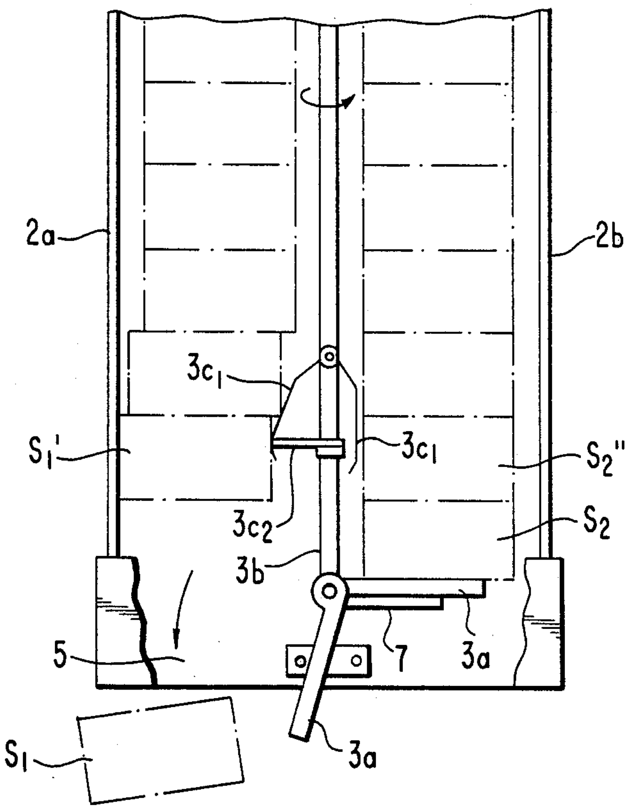
FIG. 3 PRIOR ART
FIG. 3 is a partial front end view of the dispensing mechanism of FIG. 1 illustrating its operation.
Figure 4:
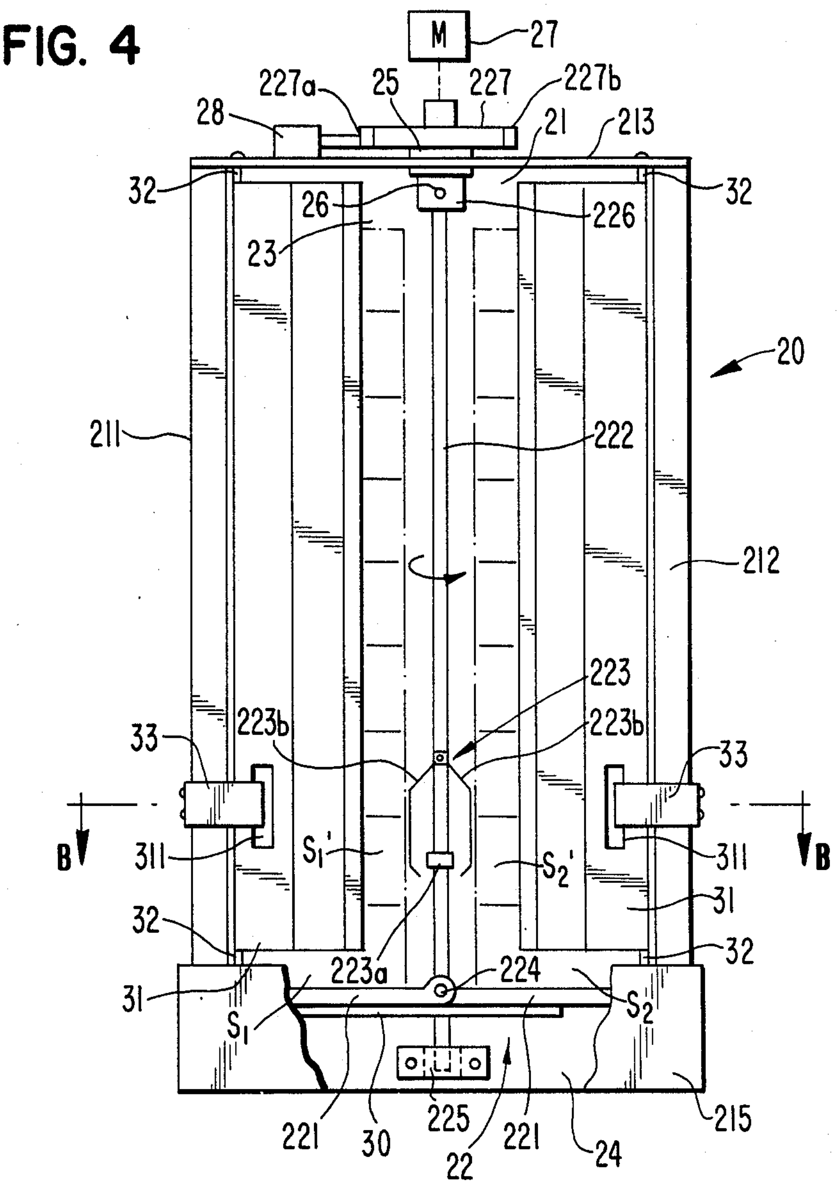
FIG. 4 is a front end view of a dispensing mechanism according to one embodiment of this invention.
Figure 5:
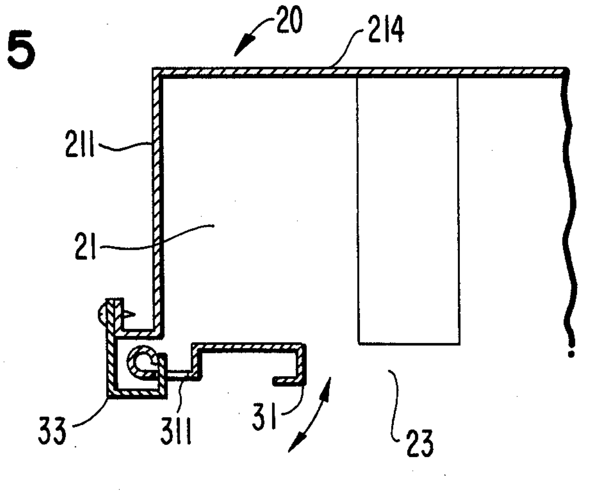
FIG. 5 is a partial sectional view taken along line B—B on FIG. 4.

Referring to FIGS. 4 and 5, dispensing mechanism unit 20 according to this invention includes an article storage area 21 and dispensing mechanism 22.

Article storage area 21 comprises vertically disposed left and right side plates 211 and 212, upper plate 213 and back plate 214. A front supporting plate 212 extends across the front lower portion of the side plates 211 and 212 and is connected to both side plates 211 and 212. A front opening 23 is formed between side plates 211 and 212, upper plate 213 and front supporting plate 215. Loading articles into storage area 21 occurs through front opening 23. Storage area 21 also has a bottom discharge opening 24 through which articles are dispensed.

Dispensing mechanism 22 is disposed in storage area 21 near the discharge opening 24 and comprises a pair of flappers 221, a rotatable shaft 222, a holding mechanism 223 for maintaining the position of pre-dispensing articles and a driving mechanism for rotating rotatable shaft 222. The pair of flappers 221 are pivotably supported on a pair of shafts 224 which are removably mounted on back plate 214 and front plate 215, respectively, the flappers being thereby disposed in the lower portion of storage area 21 to cover the discharge opening 24. Rotatable shaft 222 extends vertically through the center portion of storage area 21 to divide storage area 21 into two vertical columns for stacking articles in two stacks at the left and right sides of rotatable shaft 222. Thus, one flapper 221 is disposed below each column of articles.

The lower end portion of rotatable shaft 222 is rotatably supported by a support bracket 225 extending forwardly from the inner surface of back plate 214. The upper end portion of rotatable shaft 222 is connected to the driving mechanism which is mounted on upper plate 213. The driving mechanism includes a coupling member 226 which is rotatably supported on upper plate 213 by bearing 25. Rotatable shaft 222 is connected to coupling member 226 by a pin 26. Coupling member 226 is also connected to a motor 27 through a suitable reduction mechanism. Thus, coupling member 226 is coupled between rotatable shaft 222 and motor 27 whereby rotatable shaft 222 is driven by motor 27 through coupling member 226. Coupling member 226 has a cam 227 which has two equiangular spaced cutout portions **227*a* and 227*b* in its peripheral surface. A switch element, such as microswitch 28, is disposed adjacent the outer periphery of cam 227 to control the operation of motor 27. In this embodiment, cut-out portions 227*a* and 227*b* are formed at an angular offset 180° from one another whereby the operation of motor 27 is stopped each time after shaft 222** rotates 180°.

Rotatable shaft 222 has an arc shaped control plate 30 fixed at its lower end for contacting the lower or underside surfaces of flappers 221. When control plate 30 is in contact with both flappers, both flappers 221 are aligned to lie in a horizontal position and discharge of articles through opening 24 is blocked.

The article holding mechanism includes a radially projecting arm element **223*a* fixedly secured to rotatable shaft 222 and a pair of flappers 223*b* pivotable supported on the back plate 214 and front support plate 215. This mechanism is disposed in storage area 21 at a position adjacent the lower end of storage area 21, i.e., arm element 223*a* is at least aligned with the articles $S_1'$ and $S_2'$ which are stacked above the lowermost articles $S_1$ and $S_2$ on the upper surfaces of flappers 221. The pair of flappers 223*b* are pivotally supported on back plate 214 and front support plate 215 similar to the manner of mounting the flappers 221 of dispensing mechanism 22. The flappers 223 are pushed outwardly and upwardly by rotation of arm element 223*a* carried by shaft 222. Thus each flapper 223*b* acts as a holding member to press an article against the inner surface of side plate 211 or 212 to hold the article in a stationary position while the article below the held article is discharged through opening 24**.

Therefore, as shaft 222 rotates arm element **223*a* and control plate 30 carried by the shaft, the articles stacked in storage space 21** are dispensed one by one, this dispensing occurring alternately from the two vertical columns of articles.

Basically the structure described hereinabove with reference to FIGS. 4 and 5, insofar as the dispensing action on the articles is concerned, is generally similar to that described beginning with the third paragraph of page 1 and continuing through the paragraph ending at the top of page 3.

Referring again to FIGS. 4 and 5, a stopper plate 31 is placed over the front opening 23 of storage area 21 to partly cover the space of opening 23. The stopper plate 31 serves to prevent the articles from dropping out of the storage area 21 through opening 23. Thus, with the two vertical columns of stacked articles, a stopper plate 31 is disposed along both side portions of opening 23. These stopper plates 31 extend vertically and are pivotably supported on the upper plate 213 and front support plate 215 by means of supporting pivot pins 32. Thus, the loading of articles through the opening 23 is made possible when the stopper plates 31 are swung open to uncover the space of opening 23 leading to storage area 21.

To function as means for preventing partial deformation of the side plates 211 and 212, a U-cross sectional shaped element 33 is fixedly mounted on each of the side plates 211 and 212. As may best be seen on FIG. 4, these two U-shaped elements 33 are positioned adjacent to and opposite the flappers **223*b* of the holding mechanism 223. This positioning of the U-shaped elements 33 disposes them opposite the forces applied by flappers 223*b* in pressing the articles $S_1'$ and $S_2'$ outwardly against the side plates 211 and 212**, respectively.

As may be seen from the sectional view of FIG. 5 the U-shaped element 33 has a free end. Stopper plate 31 is formed with a rectangular hole 311 with the free end of the U-shaped element 33 extending into this rectangular hole 311. It will be understood that the utilization of U-shaped elements 33 is employed with each of the two stopper plates 31 as is shown on FIG. 4.

The interengagement between the free end of U-shaped elements 33 fixed to the side plates 211 and 212, respectively, with the rectangular holes 311 in the stopper plates 31 assures that if the pressure applied by the flappers **223*b* of holding mechanism 223 tend to partially deform the side plates 211 and/or 212, then the U-shaped element moves outwardly and the free end of the U-shaped element 33 engaged in the rectangular hole 311 of the stopper plate will resist this partial deformation. At the same time, the manner of connecting the free end of the U-shaped element 33 within the rectangular hole 311 in the stopper plate 31 ensures that the rotating motion needed to swing open the stopper plate 31** when the dispenser is to be loaded is not interfered with.

During operation of the dispensing mechanism, if the held articles stacked in the storage area are strongly pushed against a side plate due to the action of holding mechanism 223, then the free end of U-shaped element 33 moves outwardly together with partial deformation of the side plate. However, the free end finally contacts with the periphery of rectangular hole 311 in stopper plate 31 and further outward deformation of the side plate is prevented. Accordingly, partial deformation of a side plate caused by the pushing force of the holding mechanism 223 is prevented by engagement between the U-shaped element 33 and the stopper plate 31. Thus, smooth dispensing operations for the apparatus are ensured while the articles are still held in a stationary position by sufficiently strong pushing force applied by the holding mechanism 223.

This invention has been described in detail in connection with a preferred embodiment, but this embodiment is merely by way of example only and this invention is not to be considered as restricted thereto. It will be easily understood by those skilled in the art that other variations and modifications can be easily made within the scope of this invention as defined by the appended claims.

We claim:

1. In an article dispensing mechanism for dispensing articles from a vending machine including an article storage area defined by two side plates, a back plate and an upper plate to hold stacked articles and a dispensing mechanism, said storage area being provided with a front opening for loading the articles thereinto and a bottom opening for dispensing the lowermost stacked articles, said dispensing mechanism including a rotatable shaft extending through the article storage area, an article holding device disposed on the lower portion of said rotatable shaft to control the dispensing operation of the lowermost stacked articles in accordance with the rotation of said rotatable shaft and a holder member fixed on said rotatable shaft, said holder member having a holding portion for holding the desired number of articles stacked on the lower most articles by pressing the lowermost articles outwardly against said sideplates while the dispensing operation proceeds, the improvement comprising means for preventing substantial deformation of said side plates, said deformation preventing means including a deformation preventing element fixed on each of said side plates at a position opposed to said holder member and a stopper plate disposed adjacent each of said side plates and pivotally coupled to said vending machine to partly cover said front opening when said stopper plates are in a closed position, each of said deformation preventing elements being engaged wtih its corresponding stopper plate to prevent substantial deformation of said side plates.

2. The article dispensing mechanism of claim 1 wherein said deformation preventing element is U-cross sectional shaped having a free end, said free end extending into and engaging with a rectangular hole formed through said corresponding stopper plate, said stopper plates remaining free to swing open when the dispenser is to be loaded.

* * * * *